C. R. BRINCKERHOFF.
Wheel-Plow.
No. 294, Reissued Jan. 30, 1855.
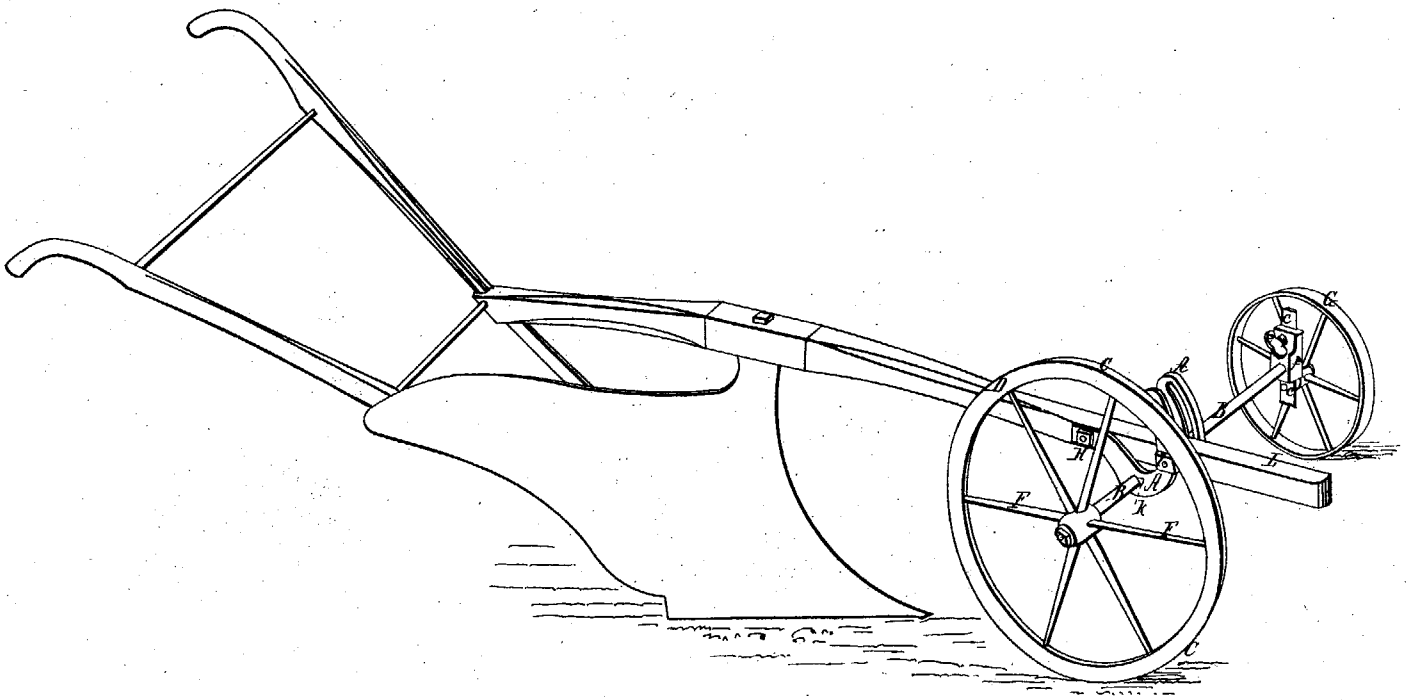
Witnesses:
H. W. Soper
C. G. Goe
Inventor:
Cornelius R. Brinckerhoff
AM. PHOTO-LITHO. CO. N.Y. (OSBORNE'S PROCESS.)

UNITED STATES PATENT OFFICE.

CORNELIUS R. BRINCKERHOFF, OF BATAVIA, NEW YORK.

IMPROVEMENT IN PLOWS.

Specification forming part of Letters Patent No. 10,101, dated October 11, 1853; Reissue No. 294, dated January 30, 1855.

*To all whom it may concern:*

Be it known that I, CORNELIUS R. BRINCKERHOFF, of Batavia, Genesee county, New York, have invented a new and Improved Addition to be attached to the common Plow, which I call the "Self-Holding and Furrow-Gage Improvement," and which is readily attached to any common plow now in use.

The nature of my invention consists in attaching to any common plow two wheels of different sizes and shapes, the small one to run upon the land, the large one to run in the bottom of the furrow, with its side against the land, by as ingle adjustable axle; in an improved form of wheel, and improvements in the modes of connecting the parts together, as hereinafter set forth. My improvements have the effect of holding the plow steady and regulating both the depth and width of the furrow.

The following with reference to the drawings is a full description of my said improvements.

On each side of the beam hangers or supporters A are fastened with a bolt, H, running through the beam about eighteen inches back of the clevis. They are sickle-shaped and bolted at the handle end, upon which they are turned as on a pivot. Holes K are made in the lower part of the curve of said hangers for the axle B to pass through, and the axle is elevated or lowered by means of a set-bolt, I, passing through a slot in the sickle end of each of said hangers or supporters and through the beam L, and the elevating or depressing the axle in this way regulates the depth of the furrow. Both wheels being connected with the same axle, both are elevated or depressed by the same adjustment, while their adjustment with reference to each other is preserved.

The axle is made of wrought-iron, is about three feet long and one and a quarter inch in diameter. It passes through said holes in the supporters, and is fastened by two iron keys or wedges in said holes, by removing which the axle can be moved either way, so that by lengthening or shortening the distance or length of the axle between the plow-beam and the large wheel D, which is placed on the furrow side of the plow, the width of the furrow is gaged to any desired width and is kept of uniform width. The axle is not permitted to revolve in the openings through the supporters.

A small cast-iron wheel, G, about thirteen inches in diameter, is placed on the end of the axle, on the land side thereof, with a slip-collar, so that the axle may be taken out of the supporters when required. A large wheel, D, which I call the "furrow-gage wheel," is placed on the other end of said axle, on the furrow or mold-board side of the plow, which is about thirty inches in diameter, is made with a cast-iron hub, wrought-iron spokes, and a wrought-iron rim about two and one-half inches wide, set on edgewise, giving it a narrow tread, and set beveling about two inches from the land.

The small wheel A may be placed on a separate short axle connected with an adjustable slide secured in a dovetailed groove in a standard attached to the shaft B, which will allow of adjustment for hillside plowing, (see *c e f*,) or to vary the depth of the furrow; or the small wheel can be dropped so that the point of the plow will be raised out of the ground, and the plow can then be moved on the wheels from place to place.

This plow scarcely requires any person to hold it, except at the turning, where it is very easily rolled round upon the large wheel.

The advantges of these improvements are apparent. A small boy or unskillful plowman can plow therewith as much and better than the best plowman without them. He has little else to do but to drive the team and at the end help balance the plow on the large wheel. More can be done and with greater ease. In turning the team does not get entangled in the harness and whiffletrees. The width of the furrow is regulated with great precision and must continue uniform. The furrow must always be turned, as the plow run steady and level. Stones and other obstructions do not affect this plow as much as the common plow. Unless the plow sticks fast, it will rise over a stone and immediately take hold of the land again.

The advantages of the sharp beveled rim and narrow tread of the large wheel are many. It runs lightly, pressing lightly against the land, gaging the width of the furrow, and casting aside any small stones that may roll against the land, which a broad wheel would have to surmount, and might cause the plow to throw out. The flat side of the wheel is supported and steadied against the land.

For making the first furrow the wheels may be raised, if desired, and afterward depressed, the small wheel resting upon the land and the large one in the angle of the furrow already made. The team is then started and the plow, without other aid, is drawn into the ground to depth desired. The wheels gage the depth. The furrow-wheel, working against the land on the inside of the furrow already made, gages the width of the furrow to be cut or the distance the plow shall run to land. The plow, being thus supported on both sides by the wheels and held down by its share and the weight of the attachment, cannot fall upon its side, and is held with great accuracy in position, and requiring very little attention.

Having thus fully described my invention and the operation of the same, what I claim therein as new and valuable, and desire to secure by Letters Patent, is—

1. Combining with the plow-beam, between the plow and the forward end of the clevis, by means of a single shaft, two wheels, one on each side of the beam, and of different diameters, the one resting in the furrow and the other on the land, for the purposes set forth and described.

2. Making the tread of the furrow-wheel narrow, for the purposes described.

3. Making the furrow-wheel beveling outward on the side which presses against the land, as above described, and for the purposes hereinbefore set forth.

4. Making the small wheel adjustable vertically with reference to the shaft or axle and the large wheel, as described.

5. The adjustable hangers, in combination with the plow-beam and axle, for the combined purpose of bracing the axle and rendering the wheels simultaneously adjustable with reference to the beam without disturbing their adjustment relatively to each other, as described.

CORNELIUS R. BRINCKERHOFF.

Witnesses:
H. U. SOPER,
EDGAR C. DIBBLE.